April 10, 1928.  
A. S. HOWELL  
1,665,207  
PHOTOGRAPHIC FILM REEL AND PROCESS OF MANUFACTURING THE SAME  
Filed April 15, 1927  
2 Sheets-Sheet 1
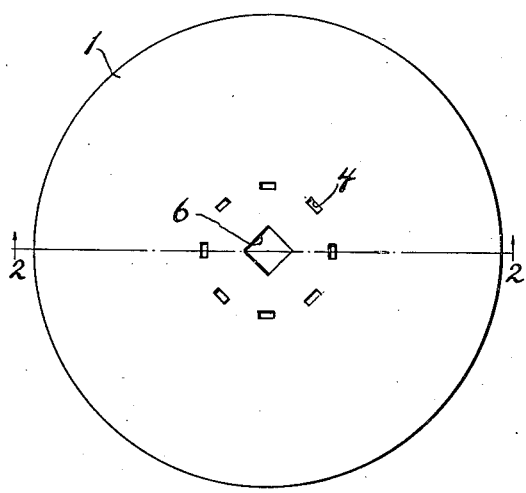
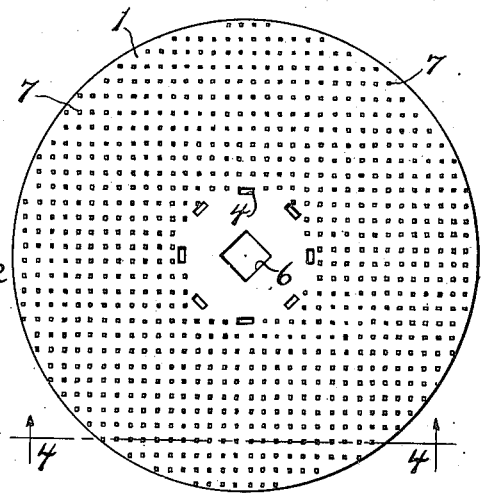
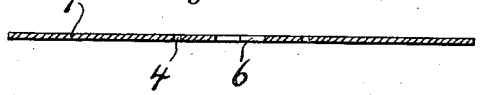
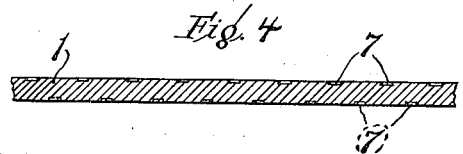
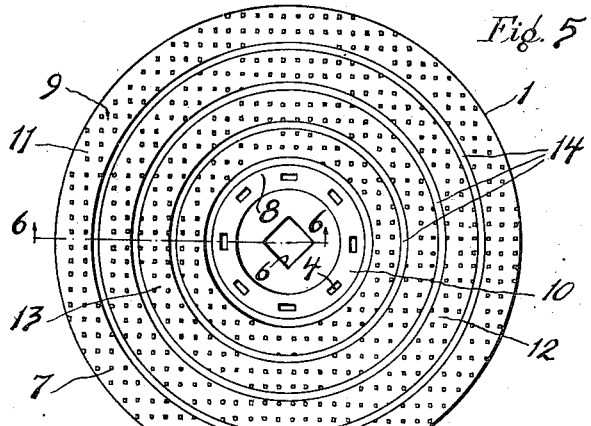
Inventor  
Albert S. Howell,  
by Miehle & Miehle  
Attorneys April 10, 1928. 1,665,207
A. S. HOWELL
PHOTOGRAPHIC FILM REEL AND PROCESS OF MANUFACTURING THE SAME
Filed April 15, 1927 2 Sheets-Sheet 2
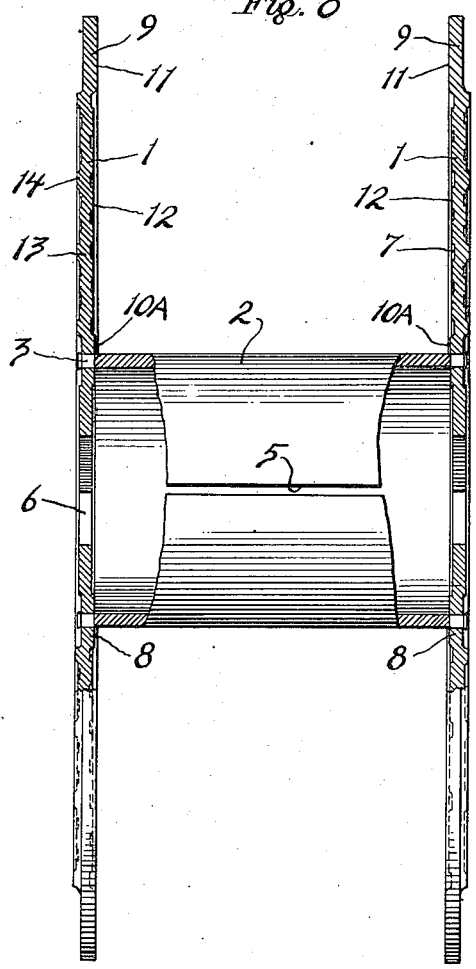
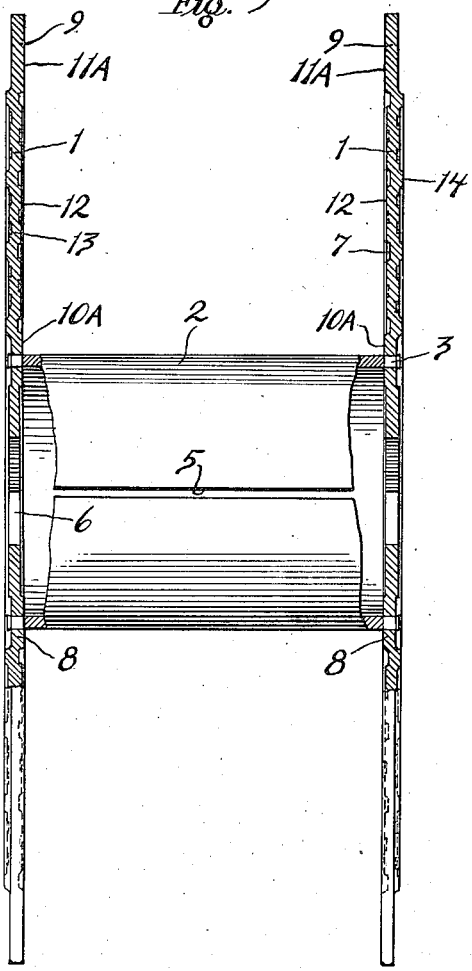
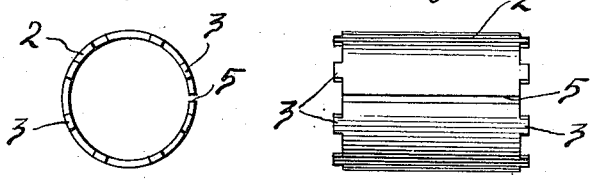
Inventor
Albert S. Howell,
by Miehle & Miehle,
Attorneys.

Patented Apr. 10, 1928.

1,665,207

UNITED STATES PATENT OFFICE.

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS.

PHOTOGRAPHIC-FILM REEL AND PROCESS OF MANUFACTURING THE SAME.

Application filed April 15, 1927. Serial No. 184,009.

My invention relates particularly to motion picture film reels which are employed in the handling of unexposed film with a view toward permitting handling of the film under ordinary light conditions without fogging or partially exposing the same and particularly with a view toward permitting daylight loading and unloading of the photographic cameras in which the film is photographically exposed.

In the marketing of unexposed film, it is usual practice to mount the film on light excluding or "solid flange" reels with strips of opaque material, such as paper, attached to the ends of the film and wound on the reels with the film. The efficacy of the exclusion of the light from the film by this method is largely dependent upon the accuracy and uniformity of the spacing of the portions of the inside surfaces of the reel flanges which lie opposite the opaque or paper strips at the ends of the film, which accuracy and uniformity of spacing of these portions of the inside surfaces of the reel flanges has heretofore been difficult to obtain particularly in the commercial or quantity manufacture of the reels.

My invention has for its main objects the provision of a reel and process of manufacture thereof whereby the desirable accuracy and uniformity of the spacing of the portions of the inside surfaces of the reel lying opposite the said opaque or paper strips may be obtained, all with a view toward manufacture in commercial quantities at reasonable cost.

The invention will be more readily understood by reference to the accompanying drawings in which—

Figure 1 is a face view of one of the flange plates of a reel before straightening;

Figure 2 is a section on the line 2—2 of Figure 1;

Figure 3 is a face view of one of the flange plates after straightening, as hereinafter described;

Figure 4 is an enlarged partial section on the line 4—4 of Figure 3;

Figure 5 is a face elevation of one of the flange plates after it has been formed, as hereinafter described;

Figure 6 is an enlarged partial section on the line 6—6 of Figure 5;

Figure 7 is a similar enlarged partial section after the flange plate has been subjected to the first machining operation, hereinafter described;

Figure 8 is a central cross section of the reel after assembly and before the final machining operation is effected, as hereinafter described;

Figure 9 is a central cross section of the finished reel;

Figure 10 is an end elevation of the hub of the reel;

Figure 11 is a side elevation of the hub.

Like characters of reference indicate like parts in the several views.

Referring to the drawings the reel consists of two flange plates 1 and a spacing hub 2 between and abutting the flange plates and provided with end lugs 3 which engage in apertures 4 and are expanded on the outsides of the plates in the assembly of the reel to secure the hub to the flange plates, the hub being provided with a longitudinal slot 5 for engagement with the inner end of a strip wound thereon, and the flange plates being provided with axial spindle apertures 6, all as is usual. See Figures 5, 8, 9, 10 and 11.

Both of the flange plates 1 and the hub 2 are preferably formed of sheet metal thick enough to afford the desired rigidity, and the flange plates are formed of metal capable of taking a set such as low carbon steel.

In the preferred process of manufacture the flange plates 1 are stamped from a sheet of suitable metal, the lug apertures 4 and spindle apertures 6 being made in the same operation. See Figures 1 and 2. Then the flange plates are straightened by surface indentation under pressure in a usual manner, as shown in Figures 3 and 4, the surface indentations 7 serving to break down the internal strains of the metal so that any tendency of the plates to lose their straightened form is greatly reduced. Following this the flange plates are formed in a usual manner to offset central portions 8 and marginal portions 9 in the same direction to project corresponding or inside faces 10 and 11 of these portions above the corresponding or inside faces 12 of the portions 13 of the plates between said central and marginal portions. Ribs 14, which as shown are concentric, are embossed, in the direction opposite the offset of the central and marginal portions 8 and 9, on the intermediate portions 13 of the flange plates for greater rigidity. See Figures 5 and 6.

After this the projected or inside surfaces 10 of the central portions 8 are machined in correspondence with portions of the flange plates outwardly thereof, and preferably in correspondence with the marginal portions 9, as by mounting a flange plate on a three point fixture engaging the marginal portion 9 thereof and grinding the inside or projected surface 10 in parallelism with the three points of said fixture, and these surfaces 10 are thus machined to planes above the corresponding or inside surfaces 12 of the intermediate portions 13 of the flange plates, these machined surfaces being indicated at 10$^A$ in the drawings. See Figures 7, 8, and 9.

The central portions 8 and the machined inside surfaces 10$^A$ thereof are engageable by the hub 2 and have outside diameters greater than that of the hub thereby continuing outwardly therefrom. After the aforementioned machining the flange plates 1 and the hub 2 are assembled to form the reel, as shown in Figure 8, with the hub abutting the inside and now machined surfaces 10$^A$ of the central portions 8 of the flanges, the lugs 3 being expanded on the outside of the flange plates. It will be observed that by reason of the machined surfaces 10$^A$ outer and marginal portions of the flange plates are cured of inaccuracies that might otherwise obtain, the hub 2 being easily formed to position the flange plates in parallelism and accurately spaced.

As the reel is thus assembled the inside or projected surfaces 11 of the marginal portions 9 are disposed in planes inside of the planes of the machined surfaces 10$^A$ of the central portions 8, and the final step in the manufacture of the reel consists in machining the surfaces 11 to a uniform spacing substantially equal to the spacing of the surfaces 10$^A$ of the central portions 8 as spaced by the hub 2, these last machined surfaces being designated at 11$^A$ in Figure 9 and being preferably machined by a grinding operation.

As hereinbefore described the central portions 8 and accordingly the machined surfaces 10$^A$ have outside diameters greater than that of the hub 2 so that the surfaces 10$^A$ continue outwardly therefrom. In the mounting of unexposed film on the reel the opaque light excluding strip on the inner end of the film lies exteriorly adjacent the hub and between the surfaces 10$^A$ of the central portion 8 and the opaque light excluding strip on the outer end of the film lies between the surfaces 11$^A$ of the marginal portions 9 for the exclusion of light, the accuracy and uniformity of the spacing of these machined surfaces 10$^A$ and 11$^A$ greatly diminishing if not entirely obviating space between these surfaces and the edges of the opaque or paper strips with the result that the possibility of light reaching the film through such space is greatly diminished if not entirely prevented without the employment of means which would interfere with winding or unwinding of the opaque or paper strips and the film on the reels.

It will be observed that by reason of the fact that the surfaces of the flange plates to be machined are projected above the corresponding surfaces of the flange plates therebetween, the machining is accomplished quite easily by reason of the machining clearance afforded and that inaccuracies in the forming of the flange plates are corrected by the machining. Furthermore, by reason of the processing of the flange plates prior to assembly particularly in respect to machining the inside surfaces of the central portions 8, the machining of the inside surfaces of the marginal portions 9 does not require the removal of much stock as the marginal portions 9 are quite uniformly spaced upon assembly of the reel. In addition it will be observed that by reason of the machined surfaces of the flange plates being comparatively small, the machining thereof does not tend to cause the plates to warp or lose their shape.

While I have herein shown and particularly described my invention in its preferred embodiment and practice I do not wish to be limited to the precise details thereof as changes may readily be made without departing from the spirit of my invention, but having thus described my invention I claim as new and desire to secure by Letters Patent the following:

1. The process of manufacture of a film reel assembled from two flange plates and a spacing hub therebetween and abutting the inside faces thereof consisting of providing the flange plates with central portions of the inside faces thereof, engageable with the hub, disposed above the surrounding portions of said inside faces, machining the inside faces of said central portions in correspondence with portions of the plates outwardly of said central portions, and then assembling the plates and hub to form the reel.

2. The process of manufacture of a film reel assembled from two sheet metal flange plates and a spacing hub therebetween and abutting faces thereof consisting of offsetting central portions of the plates, engageable with the hub and continuing outwardly to an outside diameter greater than that of the hub, machining the projected faces of said central portions in correspondence with portions of the plates outwardly of said central portions, and then assembling the plates and hub with the hub abutting said machined surfaces.

3. The process of manufacture of a film reel assembled from two sheet metal flange plates capable of taking a set and a spacing hub therebetween and abutting faces thereof consisting of straightening the flange plates by surface indentation under pressure, offsetting central portions of the plates, engageable with the hub and continuing outwardly to outside diameters greater than that of the hub, machining the projected faces of said central portions in correspondence with portions of the plates outwardly of said central portions and to planes above the corresponding faces of the portions of the plates outwardly adjacent said central portions, and then assembling the plates and hub with the hub abutting said machined surfaces.

4. The process of manufacture of a film reel assembled from two flange plates and a spacing hub therebetween, consisting of providing the flange plates with marginal portions of the inside faces thereof disposed above the portion of the inside faces thereof inwardly adjacent said marginal portions, and then machining said inside faces of said marginal portions to a predetermined uniform separation after assembly of the plates and hub to form the reel.

5. The process of manufacture of a film reel assembled from two sheet metal flange plates and a spacing hub between and abutting the inside faces thereof consisting of offsetting marginal portions of the flange plates to project the inside faces of said marginal portions above the corresponding faces of portions of the flange plates inwardly adjacent said marginal portions, and then machining said inside faces of said marginal portions to a predetermined uniform separation and to planes above said corresponding faces of said intermediate portions after assembly of the plates and hub to form the reel.

6. The process of manufacture of a film reel assembled from two sheet metal flange plates capable of taking a set and a spacing hub between and abutting the inside faces thereof consisting of straightening the flange plates by surface indentation under pressure, offsetting marginal portions of the flange plates to project the inside faces of said marginal portions above the corresponding faces of portions of the flange plates inwardly adjacent said marginal portions, and then machining said inside faces of said marginal portions to a predetermined uniform separation and to planes above said corresponding faces of said intermediate portions after assembly of the plates and hub to form the reel.

7. The process of manufacture of a film reel assembled from two sheet flange plates and a spacing hub therebetween and abutting the inside faces thereof consisting of offsetting spaced central and marginal portions thereof in one direction, said hub being engageable with said central portion, machining the projected faces of said central portions in correspondence with the portions of the plates outwardly thereof, assembling the plates and hub with the hub abutting said machined faces to form the reel, and then machining the projected faces of said marginal portions to a predetermined uniform separation.

8. The process of manufacture of a film reel assembled from two sheet metal flange plates and a spacing hub therebetween and abutting faces thereof consisting of offsetting spaced marginal and central portions of the flange plates in the same direction, said central portions being engageable with and having outside diameters greater than that of the hub, machining the projected faces of said central portions in correspondence with said marginal portions and to planes above the corresponding faces of the portions of said plates between said marginal and central portions, assembling the plates and hub with the hub abutting said machined surfaces to form the reel and then machining the projected faces of said marginal portions to a uniform separation substantially equal to that of said first mentioned machined surfaces as spaced by the hub.

9. The process of manufacture of a film reel assembled from two sheet metal flange plates capable of taking a set and a spacing hub therebetween and abutting faces thereof consisting of straightening the flange plates by surface indentation under pressure, off-setting spaced central portions, engageable with the hub, and marginal portions of the flange plates in the same direction, machining the projected faces of said central portions, assembling the plates and hub with the hub abutting said machined surfaces to form the reel, and then machining the projected faces of said marginal portions to a predetermined uniform separation.

10. The process of manufacture of a film reel assembled from two sheet metal flange plates capable of taking a set and a spacing hub therebetween and abutting faces thereof consisting of straightening the flange plates by surface indentation under pressure, offsetting spaced central and marginal portions of the flange plates in the same direction, said central portions being engageable with and having outside diameters greater than that of the hub, machining the projected faces of said central portions in correspondence with said marginal portions and to planes above the corresponding surfaces of the portions of the plates between said marginal and central portions, assembling the plates and hub with the hub engaging said machined surfaces to form the reel, and then machining the projected faces of said marginal portions to a predetermined uniform separation substantially equal to that of said first mentioned machined surfaces as spaced by said hub.

11. The process of manufacture of a film reel assembled from two sheet metal flange plates capable of taking a set and a spacing hub therebetween and abutting faces thertof consisting of straightening the flange plates by surface indentation under pressure, offseting spaced central portions engageable with the hub and marginal portions of the flange plates in the same direction and embossing strengthening ribs in the opposite direction on the intermediate portions of the flange plates between said central and marginal portions, machining the projected faces of said central portions of the plates in correspondence with said marginal portions of the plates and to planes above the corresponding faces of said intermediate portions of the plates, assembling the plates and hub with the hub engaging said machined surfaces to form the reel, and then machining the projected faces of said marginal portions to a uniform separation substantially equal to that of said first mentioned machined surfaces as spaced by said hub.

12. As an article of manufacture, a film reel assembled from two flange plates and a spacing hub therebetween and abutting the inside faces thereof, said flange plates having the inside faces of central portions thereof, engageable with the hub and having outside diameters greater than that of the hub, disposed inwardly of the inside faces of the flange plates outwardly adjacent said central portions.

13. As an article of manufacture, a film reel assembled from two sheet metal flange plates and a spacing hub therebetween and abutting the inside faces thereof, said flange plates having central portions thereof, engageable with the hub and having outside diameters greater than that of the hub, offset to project the inside faces thereof above the portions of the flange plates outwardly adjacent said central portions.

14. As an article of manufacture, a film reel assembled from two flange plates capable of taking a set and straightened by surface indentation under pressure and a spacing hub therebetween and abutting the inside faces thereof, said flange plates having central portions thereof, engageable with the hub and having outside diameters greater than that of the hub, offset to project the inside faces thereof above the portions of the flange plates outwardly adjacent said central portions and machined in correspondence with outer portions of the flange plates.

15. As an article of manufacture, a film reel assembled from two flange plates and a spacing hub therebetween, said flange plates having the marginal portions of the inside faces thereof disposed above the portion of the inside faces thereof inwardly adjacent said marginal portions and machined to a predetermined uniform separation.

16. As an article of manufacture, a film reel assembled from two sheet metal flange plates and a spacing hub therebetween, said flange plates having the marginal portions thereof offset toward each other and having the inside faces of said marginal portions machined to a predetermined uniform separation and to planes above the inside faces of portions of the flange plates inwardly adjacent said marginal portions.

17. As an article of manufacture, a film reel assembled from two sheet metal flange plates capable of taking a set and straightened by surface indentation under pressure and a spacing hub therebetween, said flange plates having the marginal portions thereof offset toward each other and having the inside surfaces of said marginal perforations machined to a predetermined uniform separation and to planes above the inside faces of portions of the flange plates inwardly adjacent said marginal portions and having strengthening ribs embossed outwardly thereon inwardly of said marginal portions.

18. As an article of manufacture, a film reel assembled from two flange plates and a spacing hub therebetween, said flange plates having the inside faces of central portions outwardly adjacent the hub and marginal portions thereof disposed inwardly of the inside faces of the portions of the flange plates between said central and marginal portions.

19. As an article of manufacture, a film reel assembled from two sheet metal flange plates and a spacing hub therebetween and abutting the inside faces thereof, said flange plates having central portions, engageable with the hub and having outside diameters greater than that of the hub, and marginal portions offset to project the inside faces of said central and marginal portions above the inside faces of the portions of the flange plates between said central and marginal portions and having the inside faces of said central and marginal portions machined to planes above the inside faces of the flange plates between said central and marginal portions.

20. As an article of manufacture, a film reel assembled from two sheet metal flange plates capable of taking a set and a spacing hub therebetween and abutting the inside faces thereof, said flange plates being straightened by indentation under pressure and having central portions, engageable with the hub and having outside diameters greater than that of the hub, and marginal portions offset to project the inside faces of said central and marginal portions above the inside faces of the portions of the flange plates intermediate said central and marginal portions and having the inside faces of said central and marginal portions machined to planes above the inside faces of said intermediate portions, and said flange plates having ribs embossed outwardly on said intermediate portions.

In witness whereof I hereunto affix my signature this 7th day of April, 1927.

ALBERT S. HOWELL.